(12) United States Patent
Saito et al.

(10) Patent No.: US 11,888,347 B2
(45) Date of Patent: Jan. 30, 2024

(54) CORE, STATOR, AND ROTARY ELECTRIC MACHINE

(71) Applicants: Sumitomo Electric Industries, Ltd., Osaka (JP); Sumitomo Electric Sintered Alloy, Ltd., Takahashi (JP)

(72) Inventors: Tatsuya Saito, Osaka (JP); Tomoyuki Ueno, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 512 days.

(21) Appl. No.: 17/281,992

(22) PCT Filed: Oct. 17, 2019

(86) PCT No.: PCT/JP2019/040974
§ 371 (c)(1),
(2) Date: Apr. 1, 2021

(87) PCT Pub. No.: WO2020/116038
PCT Pub. Date: Jun. 11, 2020

(65) Prior Publication Data
US 2021/0344238 A1    Nov. 4, 2021

(30) Foreign Application Priority Data
Dec. 5, 2018 (JP) ................................ 2018-228584

(51) Int. Cl.
*H02K 1/14* (2006.01)
*H02K 1/02* (2006.01)
*H02K 21/24* (2006.01)

(52) U.S. Cl.
CPC ............... *H02K 1/146* (2013.01); *H02K 1/02* (2013.01); *H02K 21/24* (2013.01)

(58) Field of Classification Search
CPC .......... H02K 1/146; H02K 1/148; H02K 1/12; H02K 1/02; H02K 1/27; H02K 1/06;
(Continued)

(56) References Cited

U.S. PATENT DOCUMENTS 6,445,105 B1 * 9/2002 Kliman .................. H02K 29/03
                                                        310/268
7,592,733 B2 * 9/2009 Naitou ................... H02K 1/148
                                                        310/156.33
(Continued)

FOREIGN PATENT DOCUMENTS

CN          203151249 U  *  8/2013  ............... H02K 1/22
CN          114243982 A  *  3/2022
(Continued)

OTHER PUBLICATIONS

International Search Report and Written Opinion dated Feb. 4, 2020, received for PCT Application PCT/JP2019/040974, Filed on Oct. 17, 2019, 11 pages including English translation.

*Primary Examiner* — Maged M Almawri
(74) *Attorney, Agent, or Firm* — XSENSUS LLP

(57) ABSTRACT

A core for use in an axial-gap rotary electric machine is annular and includes a plurality of core pieces into which the core is divided in a circumferential direction. Each core piece includes a yoke portion and a tooth portion that is formed integrally with the yoke portion and that projects from the yoke portion in an axial direction. Each yoke portion includes a plurality of protrusions provided on one side surface connected to the yoke portion of an adjacent one of the core pieces, and a plurality of recesses provided on other side surface connected to the yoke portion of another adjacent one of the core pieces, the recesses corresponding (Continued)

to the protrusions. An interval between the protrusions is 80% or less of a length of the one side surface of the yoke portion, the length being a direct distance between inner and outer peripheries of the yoke portion.

15 Claims, 10 Drawing Sheets

(58) Field of Classification Search
CPC ...... H02K 1/17; H02K 1/276; H02K 2203/12; H02K 2203/15; H02K 2213/03
USPC ............ 310/4, 43, 45, 179, 208, 42, 154.11, 310/156.53, 156.57, 216.067, 259, 258, 310/254
See application file for complete search history.

(56) References Cited

U.S. PATENT DOCUMENTS

| | | | | |
|---|---|---|---|---|
| 7,906,886 | B2* | 3/2011 | Jang | H02K 1/148 |
| | | | | 310/268 |
| 8,736,133 | B1* | 5/2014 | Smith | H02K 21/24 |
| | | | | 310/208 |
| 9,391,500 | B2* | 7/2016 | Smith | H02K 21/24 |
| 10,135,310 | B2* | 11/2018 | Schuler | H02K 3/521 |
| 10,170,953 | B2* | 1/2019 | Shaw | H05K 1/165 |
| 10,186,922 | B2* | 1/2019 | Schuler | H02K 11/30 |
| 10,886,796 | B2* | 1/2021 | Stetina | H02K 3/522 |
| 11,018,565 | B2* | 5/2021 | Post | H02K 1/2795 |
| 2005/0073213 | A1* | 4/2005 | Naito | H02K 1/148 |
| | | | | 310/156.32 |
| 2011/0273048 | A1* | 11/2011 | Jore | H02K 3/47 |
| | | | | 310/156.37 |
| 2011/0316381 | A1* | 12/2011 | Asano | H02K 1/182 |
| | | | | 310/216.045 |
| 2015/0155070 | A1* | 6/2015 | Cao | H02K 3/30 |
| | | | | 524/404 |
| 2015/0214801 | A1* | 7/2015 | Libault | B60L 15/2054 |
| | | | | 310/198 |
| 2017/0126108 | A1* | 5/2017 | Tokoi | H02K 1/146 |
| 2017/0155290 | A1 | 6/2017 | Sakai et al. | |
| 2018/0175707 | A1* | 6/2018 | Miyama | H02K 9/227 |
| 2019/0013708 | A1* | 1/2019 | Hattori | H02K 3/522 |
| 2019/0214860 | A1 | 7/2019 | Igarashi et al. | |
| 2019/0252930 | A1* | 8/2019 | Stetina | H02K 3/522 |
| 2019/0260255 | A1* | 8/2019 | Kuwahara | H02K 3/325 |
| 2020/0328634 | A1* | 10/2020 | Mihaila | H02K 15/022 |
| 2021/0091608 | A1* | 3/2021 | Hull | H02K 7/14 |
| 2021/0091647 | A1* | 3/2021 | Maruyama | H02K 21/24 |
| 2021/0143696 | A1* | 5/2021 | Guedes-Pinto | H02K 11/30 |
| 2021/0152040 | A1* | 5/2021 | Yao | H02K 1/14 |
| 2022/0045582 | A1* | 2/2022 | Hunstable | H02K 15/08 |
| 2022/0060065 | A1* | 2/2022 | Wu | H02K 1/148 |
| 2022/0239177 | A1* | 7/2022 | Hillman | H02K 21/24 |
| 2022/0239210 | A1* | 7/2022 | Hillman | H02K 29/03 |
| 2022/0302773 | A1* | 9/2022 | Leijnen | H02K 1/182 |
| 2023/0048820 | A1* | 2/2023 | Yao | H02K 1/2798 |

FOREIGN PATENT DOCUMENTS

| | | | | |
|---|---|---|---|---|
| CN | 115333262 | A * | 11/2022 | |
| DE | 102021102807 | A1 * | 9/2021 | ............ H02K 1/146 |
| EP | 3174183 | A1 * | 5/2017 | ............ H02K 1/141 |
| JP | 2008-35599 | A | 2/2008 | |
| JP | 2008035599 | A * | 2/2008 | |
| JP | 2008-125278 | A | 5/2008 | |
| JP | 2010088166 | A * | 4/2010 | |
| JP | 2011-135626 | A | 7/2011 | |
| JP | 2017-229191 | A | 12/2017 | |
| WO | WO-2011065080 | A1 * | 6/2011 | ........ F04D 13/0626 |
| WO | 2015/145901 | A1 | 10/2015 | |
| WO | 2017/221512 | A1 | 12/2017 | |

* cited by examiner

CORE, STATOR, AND ROTARY ELECTRIC MACHINE

CROSS-REFERENCE TO RELATED APPLICATIONS

The present application is based on PCT filing PCT/JP2019/040974, filed Oct. 17, 2019, which claims priority to Japanese Patent Application No. 2018-228584, filed on Dec. 5, 2018, the entire contents of each are incorporated herein by reference.

TECHNICAL FIELD

The present disclosure relates to a core, a stator, and a rotary electric machine.

BACKGROUND ART

PTL 1 discloses an axial-gap rotary electric machine including a rotor and a stator arranged to face each other in an axial direction. This type of rotary electric machine includes a stator including a core and coils. The core includes a circular annular yoke portion and a plurality of tooth portions that project from the yoke portion in the axial direction. The coils are provided around respective ones of the tooth portions. According to PTL 1, the core is divided into a plurality of core pieces in the circumferential direction, and each core piece is formed of a dust core including a yoke portion and tooth portions that are formed integrally with the yoke portion.

CITATION LIST

Patent Literature

PTL 1: Japanese Unexamined Patent Application Publication No. 2017-229191

SUMMARY OF INVENTION

A core according to the present disclosure is for use in an axial-gap rotary electric machine. The core is annular and includes a plurality of core pieces into which the core is divided in a circumferential direction. Each core piece includes a yoke portion and a tooth portion that is formed integrally with the yoke portion and that projects from the yoke portion in an axial direction. Each yoke portion includes a plurality of protrusions provided on one side surface that is connected to the yoke portion of an adjacent one of the core pieces, and a plurality of recesses provided on other side surface that is connected to the yoke portion of another adjacent one of the core pieces, the recesses corresponding to the protrusions. An interval between the protrusions is 80% or less of a length of the one side surface of the yoke portion, the length being a direct distance between inner and outer peripheries of the yoke portion.

A stator according to the present disclosure is a stator for an axial-gap rotary electric machine, and includes the core according to the present disclosure and a coil disposed on each of the tooth portions of the core pieces that constitute the core.

A rotary electric machine according to the present disclosure includes a rotor and a stator. The rotary electric machine is an axial-gap rotary electric machine in which the rotor and the stator are arranged to face each other in an axial direction. The stator is the stator according to the present disclosure.

DESCRIPTION OF EMBODIMENTS

Figure 1:
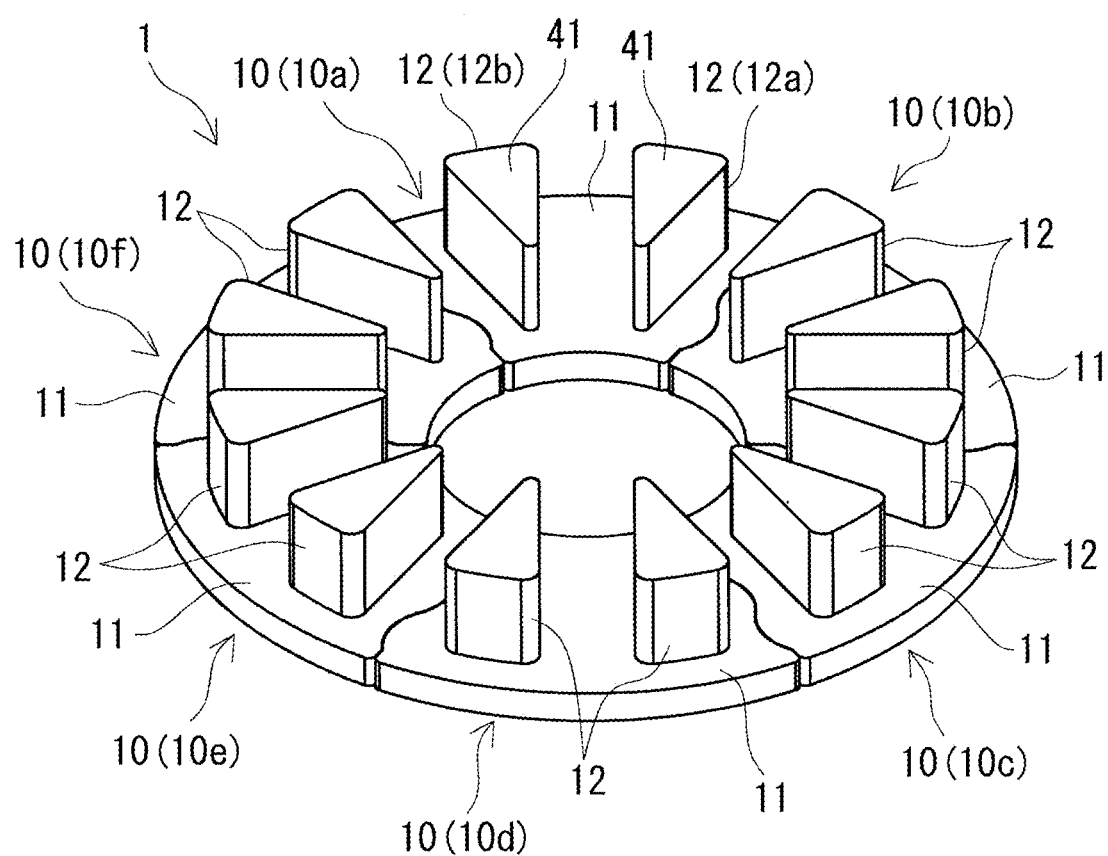
FIG. 1 is a schematic perspective view of a core according to an embodiment.

Problems to be Solved by Present Disclosure

To facilitate production of the axial-gap rotary electric machine, it is desirable to facilitate assembly of the core.

When the core is formed of a plurality of core pieces, the core pieces need to be assembled into an annular shape such that side surfaces of yoke portions of adjacent ones of the core pieces are abutted against and connected to each other. When the yoke portion of each core piece has side surfaces that extend radially straight as in PTL 1, it is difficult to position the yoke portions of the adjacent ones of the core pieces relative to each other. For example, the core pieces may be assembled into an annular shape such that the adjacent ones of the core pieces are radially displaced from each other.

An object of the present disclosure is to provide a core that is easy to assemble. Another object of the present disclosure is to provide a stator including the core. Another object of the present disclosure is to provide a rotary electric machine including the stator.

Advantageous Effects of Present Disclosure

The core according to the present disclosure is easy to assemble. The stator according to the present disclosure includes the core that is easy to assemble. The rotary electric machine according to the present disclosure is easy to produce.

DESCRIPTION OF EMBODIMENTS OF PRESENT DISCLOSURE

The inventors of the present disclosure have arrived at the idea of forming a protrusion on one side surface of the yoke portion of each core piece and a recess corresponding to the protrusion on the other side surface, so that the yoke portions of adjacent ones of the core pieces can be positioned relative to each other by fitting the protrusion and the recess together. The inventors of the present disclosure have conducted intensive studies and found that, when a core piece including a yoke portion having a protrusion on a side surface thereof is composed of a dust core and is formed by using a mold, a die for forming a peripheral surface of the yoke portion receives a large stress in a region corresponding to the side surface of the yoke portion. When the die receives an excessive stress, breakage of the die may occur. Therefore, it is important to design the protrusion on the side surface of the yoke portion such that the load placed on the die is as small as possible. The inventors of the present disclosure have further conducted intensive studies and found that, as described below, the stress applied to the die can be reduced by forming a plurality of protrusions on a side surface of the yoke portion and setting the interval between the protrusions to 80% or less of the length of the side surface of the yoke portion.

The present disclosure has been made based on the above-described findings. Embodiments of the present disclosure will now be described.

(1) A core according to an embodiment of the present disclosure is for use in an axial-gap rotary electric machine. The core is annular and includes a plurality of core pieces into which the core is divided in a circumferential direction. Each core piece includes a yoke portion and a tooth portion that is formed integrally with the yoke portion and that projects from the yoke portion in an axial direction. Each yoke portion includes a plurality of protrusions provided on one side surface that is connected to the yoke portion of an adjacent one of the core pieces, and a plurality of recesses provided on other side surface that is connected to the yoke portion of another adjacent one of the core pieces, the recesses corresponding to the protrusions. An interval between the protrusions is 80% or less of a length of the one side surface of the yoke portion, the length being a direct distance between inner and outer peripheries of the yoke portion.

According to the core of the present disclosure, adjacent ones of the core pieces can be easily positioned relative to each other, and the core is easy to assemble. The reason for this is that since the yoke portion of each core piece has the plurality of protrusions on one side surface and the plurality of recesses on the other side surface, the yoke portions of adjacent ones of the core pieces can be positioned relative to each other by fitting the protrusions to the recesses. Thus, according to the core of the present disclosure, the core pieces can be assembled into an annular shape with less radial displacements between the core pieces that are adjacent to each other.

When the core pieces are dust cores, the core pieces composed of the dust cores may be formed by compression molding by using soft magnetic powder, which is a collection of a plurality of soft magnetic particles. When each core piece is formed by using a mold, since the interval between the protrusions on one side surface of the yoke portion is 80% or less of the length of the one side surface of the yoke portion, stress applied to a side surface of a die for forming the one side surface of the yoke portion can be reduced. Thus, load placed on the die can also be reduced, so that the possibility of breakage of the die can be reduced. The meaning of the interval between the protrusions and the reason why the stress applied to the die can be reduced will be described below.

(2) According to one embodiment of the above-described core, in plan view of each yoke portion from a side toward which the tooth portion projects, a distance from the recesses to a bottom of the tooth portion is 20% or more of a distance from a reference line to the bottom of the tooth portion, the reference line being a middle line between a side surface of the tooth portion and a side surface of the tooth portion of the other adjacent one of the core pieces, the side surfaces facing each other.

According to this embodiment, since each core piece is structure such that the distance from the recesses to the bottom of the tooth portion is 20% or more of the distance from the reference line to the bottom of the tooth portion, a certain interval is provided between each of the recesses and the bottom of the tooth portion on a surface of the yoke portion at a side at which the tooth portion projects. Accordingly, when each core piece is a dust core and is formed by using a mold, reduction in the strength of a punch for forming the surface of the yoke portion at the side at which the tooth portion projects due to reduction in the thickness of the punch can be suppressed.

(3) According to another embodiment of the above-described core, the protrusions have a size of 1 mm or more and 10 mm or less.

According to this embodiment, since the protrusions have a size of 1 mm or more, the yoke portions of the adjacent ones of the core pieces can be easily positioned relative to each other. When each core piece is a dust core, since the protrusions have a size of 10 mm or less, the core piece can be easily formed. The meaning of the size of the protrusions will be described below.

(4) According to another embodiment of the above-described core, in plan view of each yoke portion from a side toward which the tooth portion projects, a minimum radius of curvature of the protrusions and the recesses is 1.0 mm or more.

According to this embodiment, when each core piece is a dust core, the possibility of breakage of the die can be reduced. The reason for this is that since the minimum radius of curvature of the protrusions and the recesses is 1.0 mm or more, when the core piece is formed by using a mold, stress concentration at the die for forming the side surfaces of the yoke portion can be reduced.

(5) According to another embodiment of the above-described core, adjacent ones of the protrusions have shapes that are symmetrical about a center line between the adjacent ones of the protrusions.

According to this embodiment, when each core piece is a dust core, the possibility of breakage of the die can be more effectively reduced. The reason for this is that since the adjacent ones of the protrusions have shapes that are symmetrical, when the core piece is formed by using a mold, stress applied to the die can be effectively reduced.

(6) According to another embodiment of the above-described core, each yoke portion has a thickness of 1.0 mm or more and 10 mm or less.

The above-described core may be formed by assembling the core pieces into an annular shape and fitting and fixing an annular member to outer peripheral surfaces of the yoke portions to fasten the core pieces together. When the yoke portions have a thickness of 1.0 mm or more, the annular member can be easily fixed, and an appropriate fastening force can be easily applied. When each yoke portion is excessively thick, large load is placed on the die. Therefore, the thickness of each yoke portion is set to 10 mm or less.

(7) According to another embodiment of the above-described core, each core piece is formed of a dust core. The dust core is made of a collection of a plurality of coated soft magnetic particles, which are soft magnetic particles having insulating coatings on surfaces thereof. The soft magnetic particles are iron-based particles composed of at least one of pure iron and an iron-based alloy. The iron-based alloy is at least one selected from a group consisting of an Fe—Si-based alloy, an Fe—Al-based alloy, an Fe—Cr—Al-based alloy, and an Fe—Cr—Si-based alloy.

Pure iron and the above-described iron-based alloy are relatively soft. Therefore, when the soft magnetic particles that constitute the dust core are iron-based particles composed of pure iron or the above-described iron-based alloy, the soft magnetic particles are easily deformed when the dust core is formed. Accordingly, in this embodiment, a high-density dust core having a high dimensional accuracy can be obtained. When a high-density dust core is used, the mechanical strength and magnetic properties of the core piece can be improved. When the soft magnetic particles have insulating coatings on the surfaces thereof, the electrical insulation between the soft magnetic particles can be increased. Therefore, iron loss of the core piece due to eddy current loss can be reduced.

(8) According to an embodiment of the core described in (7), the insulating coatings include phosphate coatings.

The phosphate coatings are highly adhesive to the iron-based particles, and are easily deformed. Therefore, when the insulating coatings include the phosphate coatings, the insulating coatings easily follow the deformation of the iron-based particles when the dust core is formed. Accordingly, in this embodiment, the insulating coatings are not easily damaged, and the iron loss of the core piece can be reduced.

(9) According to an embodiment of the core described in (7) or (8), the dust core has a relative density of 90% or more.

When the relative density of the dust core is 90% or more, the dust core has a high density. According to this embodiment, since the dust core has a high density, the mechanical strength and magnetic properties of the core piece can be improved.

(10) According to another embodiment of the above-described core, the core further includes an annular member fitted to outer peripheral surfaces of the yoke portions of the plurality of core pieces, and the annular member is fixed to the plurality of core pieces by radially inward contraction force thereof.

When the core includes the annular member fitted to the outer peripheral surfaces of the yoke portions, the core pieces that are assembled in an annular shape can be integrated together. In addition, the outer peripheries of the yoke portions are fastened by the radially inward contraction force of the annular member, so that the core pieces can be strongly fastened together.

(11) According to another embodiment of the above-described core, the side surfaces of the yoke portions of the core pieces that are adjacent to each other are bonded to each other. Alternatively, the core includes a plate-shaped member disposed on the yoke portions of the core pieces that are adjacent to each other at a side opposite to a side at which the tooth portions project, and surfaces of the yoke portions at the opposite side are bonded to the plate-shaped member.

When the side surfaces of the yoke portions of the core pieces that are adjacent to each other are bonded to each other or when the surfaces of the yoke portions at the side opposite to the side at which the tooth portions project are bonded to the plate-shaped member, the core pieces that are assembled in an annular shape can be integrated together.

(12) According to another embodiment of the above-described core, a difference between a position of an end surface of a highest one of the tooth portions of the plurality of core pieces and a position of an end surface of a lowest one of the tooth portions of the plurality of core pieces is 0.15 mm or less.

When the surfaces of the yoke portions at the side opposite to the side at which the tooth portions project are placed on a flat surface and when the difference between the position of the end surface of the highest tooth portion and the position of the end surface of the lowest tooth portion is 0.15 mm or less, variation in height between the end surfaces of the tooth portions is small. When the above-described core is included in a rotary electric machine, the end surfaces of the tooth portions are arranged to face magnets of a rotor. When the variation in height between the end surfaces of the tooth portions is small, the rotary electric machine can be structured such that variation in the interval between the end surface of each tooth portion and the rotor is small. Therefore, degradation of the properties of the rotary electric machine can be suppressed. For example, cogging can be reduced.

(13) According to another embodiment of the above-described core, when the plurality of core pieces are assembled in an annular shape, a deviation from roundness of outer peripheral surfaces of the yoke portions is 0.1 mm or less.

When the deviation from roundness of the outer peripheral surfaces of the yoke portions is 0.1 mm or less, the core has a high dimensional accuracy.

(14) According to another embodiment of the above-described core, a deviation from flatness of an end surface of each tooth portion is 0.2 mm or less.

When the deviation from flatness of the end surface of each tooth portion is 0.2 mm or less, the rotary electric machine can be structured such that the end surfaces of the tooth portions closely face the rotor. Accordingly, degradation of the properties of the rotary electric machine can be suppressed.

(15) A stator according to an embodiment of the present disclosure is a stator for an axial-gap rotary electric machine, and includes the core according to any one of (1) to (14) and a coil disposed on each of the tooth portions of the core pieces that constitute the core.

The core included in the stator of the present disclosure is easy to assemble. The core is easy to assemble because the adjacent ones of the core pieces can be easily positioned relative to each other.

(16) A rotary electric machine according to an embodiment of the present disclosure includes a rotor and a stator. The rotary electric machine is an axial-gap rotary electric machine in which the rotor and the stator are arranged to face each other in an axial direction, and the stator is the stator according to (15).

The rotary electric machine according to the present disclosure is easy to produce. This is because the stator included in rotary electric machine includes the core that is easy to assemble.

DETAILED DESCRIPTION OF EMBODIMENT OF PRESENT DISCLOSURE

A core, a stator, and a rotary electric machine according to an embodiment of the present disclosure will now be described with reference to the drawings. In the drawings, components denoted by the same reference signs are those having the same names. The present invention is not limited to the examples described below. The present invention is defined by the scope of the claims, and is intended to include equivalents to the scope of the claims and all modifications within the scope.

<Core>

Figure 2:
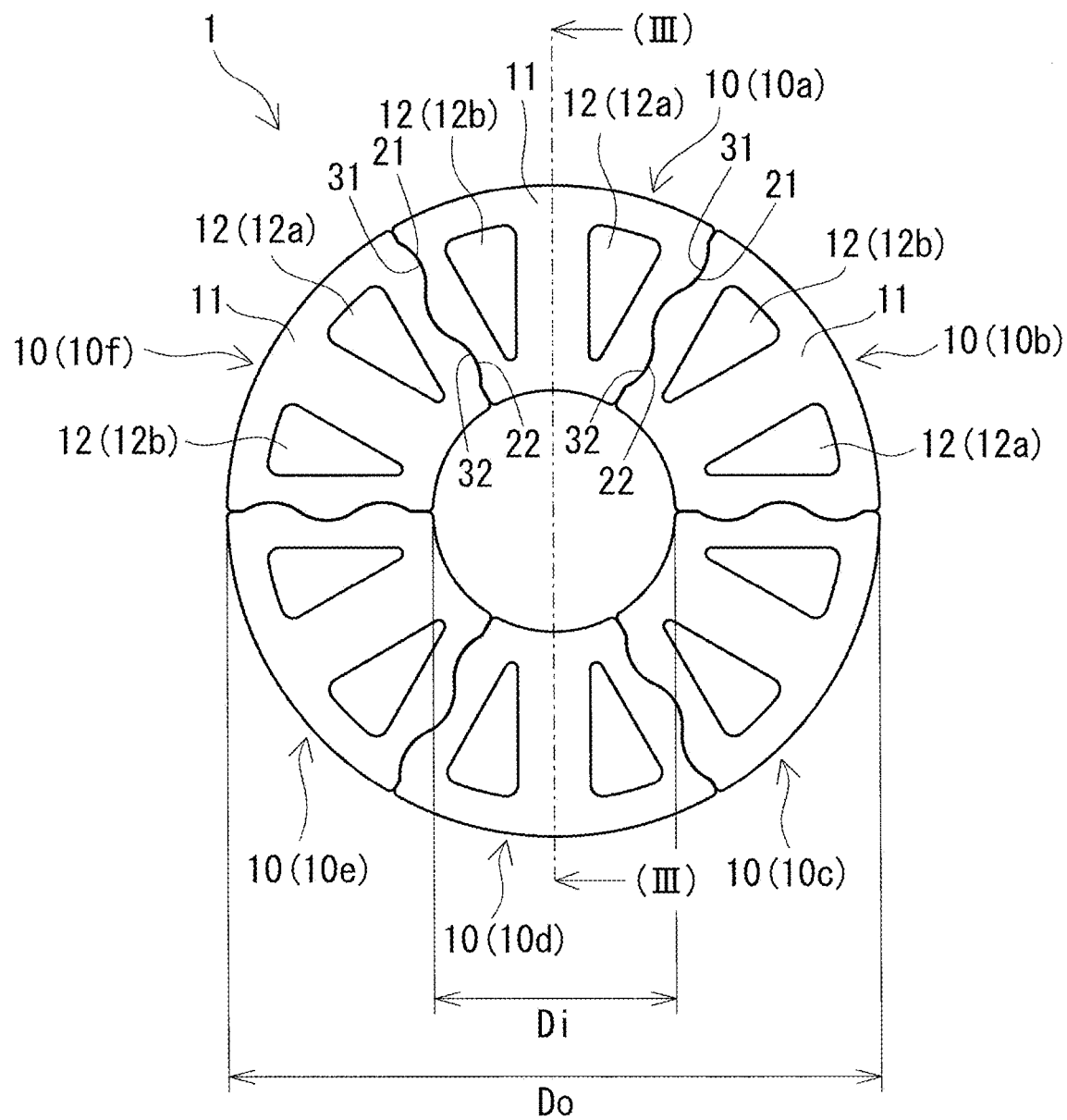
FIG. 2 is a schematic top view of the core according to the embodiment.

A core 1 according to an embodiment and core pieces 10 that constitute the core 1 will be described with reference to FIGS. 1 to 10. The core 1 is for use in an axial-gap rotary electric machine. More specifically, the core 1 may be used as a core of a stator. As illustrated in FIGS. 1 and 2, the core 1 is annular and includes the core pieces 10 into which the core 1 is divided in a circumferential direction. More specifically, the core 1 is formed by assembling the core pieces 10 together into an annular shape. In this example, the number of core pieces 10 is six. Each core piece 10 includes a yoke portion 11 and tooth portions 12 that project from the yoke portion 11 in an axial direction (see also FIGS. 4 and 5). In the following description, when the core 1 and the core pieces 10 are described, a side toward which the tooth portions 12 project is defined as an upper side, and a side opposite thereto is defined as a lower side.

In this example, as illustrated in FIGS. 1 and 2, the core 1 has a circular annular shape. More specifically, the core 1 is structured such that the yoke portions 11 are arranged in the shape of a circular annular plate and that the tooth portions 12 are arranged at equal intervals in the circumferential direction. In this example, the number of tooth portions 12 is twelve. In this example, the core 1 is evenly divided into six pieces so that the core 1 includes the six core pieces 10, more specifically, core pieces 10a to 10f. The core pieces 10a to 10f have the same shape. The core 1 is formed by assembling the six core pieces 10a to 10f into a circular annular shape such that side surfaces 20 and 30 (see FIGS. 4 and 5) of the yoke portions 11 of adjacent ones of the core pieces 10 are abutted against and connected to each other. The number of partitions of the core 1, that is, the number of core pieces 10, may be selected as appropriate. The number of tooth portions 12 included in the core 1 may also be set as appropriate.

(Core Piece)

Figure 4:
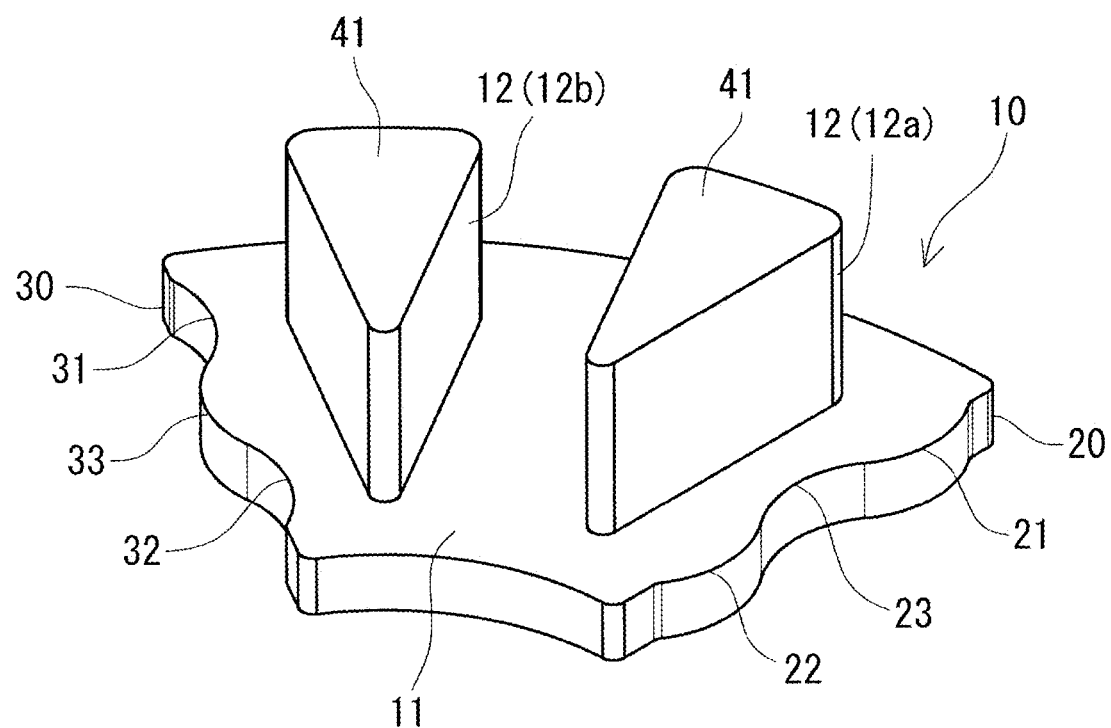
FIG. 4 is a schematic perspective view of a core piece.
Figure 5:
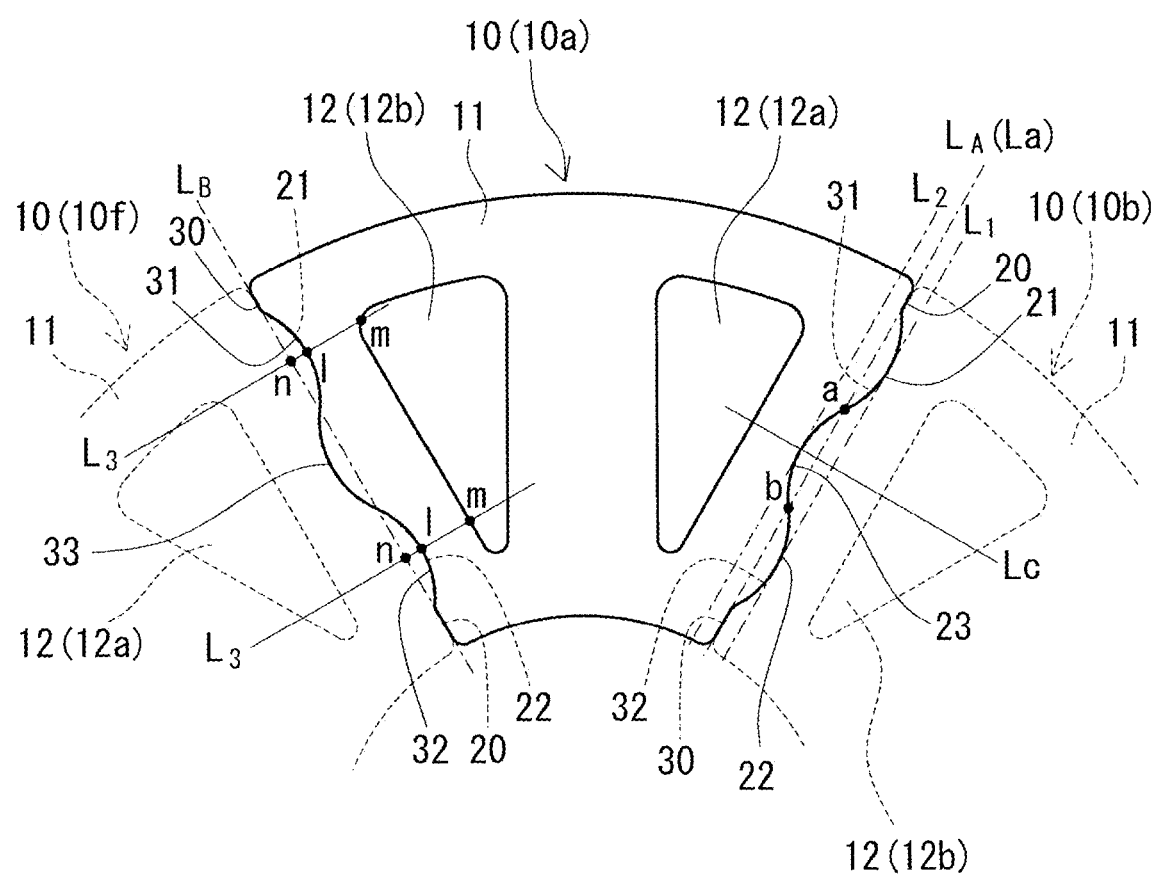
FIG. 5 is a schematic top view of the core piece.

As illustrated in FIGS. 4 and 5, each core piece 10 includes the yoke portion 11 and the tooth portions 12. The core piece 10 is formed of a dust core. The yoke portion 11 and the tooth portions 12 are formed integrally with each other.

(Yoke Portion)

The yoke portion 11 is a fan-shaped plate portion of the core piece 10. The yoke portion 11 has fan-shaped flat surfaces, and the tooth portions 12 project from one of the flat surfaces. The one of the flat surfaces is an upper surface. The yoke portion 11 has an arc-shaped inner peripheral surface, an arc-shaped outer peripheral surface, and the side surfaces 20 and 30. The arc-shaped inner peripheral surface and the arc-shaped outer peripheral surface are concentric.

(Tooth Portions)

The tooth portions 12 are portions that are formed integrally with the yoke portion 11 and that project in the axial direction from the one of the flat surfaces, that is, the upper surface, of the yoke portion 11. The axial direction is a direction orthogonal to the radial and circumferential directions of the core 1, more specifically, a direction perpendicular to the upper surface of the yoke portion 11. The tooth portions 12 may be columnar bodies, which may be, for example, polygonal columnar bodies, cylindrical bodies, or elliptic cylindrical bodies. Examples of polygonal columnar bodies include triangular columnar bodies and trapezoidal columnar bodies. In this example, the tooth portions 12 are triangular columnar bodies, and include end surfaces 41 having a triangular shape, more specifically, the shape of an isosceles triangle. The tooth portions 12 may instead be trapezoidal columnar bodies, and the end surfaces 41 may have, for example, a trapezoidal shape. The terms "triangular" and "trapezoidal" do not necessarily refer to shapes that are perfectly geometrically triangular or trapezoidal, and cover substantially triangular or trapezoidal shapes, such as those having rounded corners.

The number of tooth portions 12 included in each core piece 10 may be one or more. In this example, two tooth portions 12 (12a and 12b) are provided. One of the tooth portions 12 that is positioned adjacent to the side surface 20 of the yoke portion 11 is defined as the tooth portion 12a, and the other of the tooth portions 12 that is positioned adjacent to the side surface 30 is defined as the tooth portion 12b.

One characteristic of the core 1 is that, as illustrated in FIGS. 4 and 5, one side surface 20 of the yoke portion 11 of each core piece 10 has a plurality of protrusions 21 and 22, and the other side surface 30 has a plurality of recesses 31 and 32 that correspond to the protrusions 21 and 22. Another characteristic of the core 1 is that the interval between the protrusions 21 and 22 is 80% or less of the length of the side surface 20 of the yoke portion 11.

<Protrusions and Recesses>

The yoke portion 11 includes the protrusions 21 and 22 provided on one side surface 20 and the recesses 31 and 32 provided on the other side surface 30. The shape of the protrusions 21 and 22 on the side surface 20 and the shape of the recesses 31 and 32 on the side surface 30 correspond to each other. A recess 23 is provided between the protrusions 21 and 22, and a protrusion 33 is provided between the recesses 31 and 32. In this example, the protrusions 21 and 22 and the recesses 31 and 32 have the same arc shape and the same size. As illustrated in FIG. 5, one side surface 20 of the yoke portion 11 of the core piece 10a is connected to the side surface 30 of the yoke portion 11 of one adjacent core piece 10b. The other side surface 30 of the yoke portion 11 of the core piece 10a is connected to the side surface 20 of the yoke portion 11 of the other adjacent core piece 10f. Thus, the protrusions 21 and 22 on the side surface 20 of the yoke portion 11 of the core piece 10a are respectively fitted to the recesses 31 and 32 on the side surface 30 of the yoke portion 11 of the adjacent core piece 10b. The recesses 31 and 32 on the side surface 30 of the yoke portion 11 of the core piece 10a are respectively fitted to the protrusions 21 and 22 on the side surface 20 of the yoke portion 11 of the adjacent core piece 10f. The protrusions 21 and 22 and the recesses 31 and 32 are fitted to each other so that the yoke portions 11 of the core piece 10a and the core pieces 10b and 10f adjacent thereto can be positioned relative to each other. Thus, the core pieces 10 can be assembled into an annular shape with less radial displacements between the core pieces 10 that are adjacent to each other.

In this example, the number of protrusions 21 and 22 and the number of recesses 31 and 32 are two. The number of protrusions 21 and 22 and the number of recesses 31 and 32 may be changed as appropriate, and may be three or more. The shape of the protrusions 21 and 22 and the shape of the recesses 31 and 32 may also be changed as appropriate, and may be, for example, a rectangular shape or a triangular shape. In this example, the protrusions 21 and 22 have the same shape. However, the protrusions 21 and 22 may instead have different shapes.

<Interval between Protrusions>

The interval between the protrusions 21 and 22 is 80% or less of the length of the side surface 20 of the yoke portion 11. The definition of the interval between the protrusions 21 and 22 will now be described. In this example, as illustrated in FIG. 5, a middle line $L_A$ is drawn so that the middle line $L_A$ passes through midpoints between the tooth portion 12a of the core piece 10a and the tooth portion 12b of the one adjacent core piece 10b. More specifically, the middle line $L_A$ is a line that passes through midpoints between a side surface of the tooth portion 12a of the core piece 10a and a side surface of the tooth portion 12b of the core piece 10b, the side surfaces facing each other. The middle line $L_A$ is a straight line that extends in a radial direction of the annular core 1. Next, a straight line $L_1$ is drawn so that the straight line $L_1$ is parallel to the middle line $L_A$ and passes through the apices of the protrusions 21 and 22. In addition, a straight line $L_2$ is drawn so that the straight line $L_2$ is parallel to the middle line $L_A$ and passes through the apex of the recess 23 positioned between the adjacent protrusions 21 and 22. Two points at which facing surfaces of the adjacent protrusions 21 and 22 cross a center line La between the straight lines $L_1$ and $L_2$ are defined as points a and b. The distance between these two points a and b is defined as the interval between the protrusions 21 and 22. In this example, the middle line $L_A$ coincides with the center line La. The length of the side surface 20 of the yoke portion 11 is defined as a direct distance between the inner and outer peripheries of the yoke portion 11. In other words, the length of the side surface 20 of the yoke portion 11 is the radial distance between the inner and outer peripheries of the yoke portion 11. In the following description, the length of the side surface 20 of the yoke portion 11 may be referred to simply as a "yoke-portion side length".

When the interval between the protrusions 21 and 22, which is the distance between points a and b in FIG. 5, is 80% or less of the yoke-portion side length, as described below, each core piece 10 can be formed by using a mold 5 (see FIG. 6) with less stress applied to a side surface 52 (see FIGS. 7 and 8) of a die 50 for forming the side surface 20 of the yoke portion 11. The reason for this will be described below with reference to FIG. 8.

The ratio of the interval between the protrusions 21 and 22 to the yoke-portion side length may be 70% or less, or 50% or less. The interval between the protrusions 21 and 22 may be, for example, 40 mm or less, or 30 mm or less. The protrusions 21 and 22 cannot be easily formed when the interval therebetween is excessively small. Therefore, the lower limit of the interval between the protrusions 21 and 22 may be, for example, about 1.0 mm.

<Adjacent Protrusions Having Symmetrical Shapes>

In this example, the adjacent protrusions 21 and 22 have shapes that are symmetrical about a center line between the protrusions 21 and 22. As illustrated in FIG. 5, the center line between the protrusions 21 and 22 is a straight line $L_C$ that is orthogonal to the center line La and that passes through the midpoint of a line segment ab. When the protrusions 21 and 22 have shapes that are symmetrical to each other, the stress applied to the side surface 52 (see FIGS. 7 and 8) of the die 50 can be effectively reduced.

<Distance from Recesses to Bottom of Tooth>

In this example, the distance from the recesses 31 and 32 to the bottom of the tooth portion 12 (12b) is 20% or more of the distance from a reference line denoted by $L_B$ in FIG. 5 to the bottom of the tooth portion 12 (12b). In plan view of the yoke portions 11 from above, that is, from the upper side toward which the tooth portions 12 project, the reference line is a middle line between the tooth portions 12 of adjacent ones of the core pieces 10. In this example, as illustrated in FIG. 5, the reference line is a middle line $L_B$ that passes through midpoints between the tooth portion 12b of the core piece 10a and the tooth portion 12a of the other adjacent core piece 10f. More specifically, the middle line $L_B$ is a line that passes through midpoints between a side surface of the tooth portion 12b of the core piece 10a and a side surface of the tooth portion 12a of the core piece 10f, the side surfaces facing each other. The middle line $L_B$ is a straight line that extends in a radial direction of the annular core 1. Next, straight lines $L_3$ are drawn so that the straight lines $L_3$ are orthogonal to the middle line $L_B$ and pass through the apices of the recesses 31 and 32. The apex of each of the recesses 31 and 32 on each straight line $L_3$ is denoted by l, and an intersection between each straight line $L_3$ and the periphery of the tooth portion 12b is denoted by m. The distance between these two points l and m is defined as the distance from the recesses 31 and 32 to the bottom of the tooth portion 12b. An intersection between each straight line $L_3$ and the middle line $L_B$ is denoted by n. The distance between the two points n and m is defined as the distance from the reference line to the bottom of the tooth portion 12b. When the straight lines $L_3$ are drawn, the apices of the recesses 31 and 32 are defined as points on the recesses 31 and 32 that are farthest from the middle line $L_B$. In other words, the apices of the recesses 31 and 32 are defined as points on the recesses 31 and 32 that are closest to the bottom of the tooth portion 12b.

Assuming that the above-described middle line $L_B$ is the reference line, the ratio of the distance from the recesses 31 and 32 to the bottom of the tooth portion 12 (12b) to the distance from the reference line to the bottom of the tooth portion 12 (12b) is 20% or more. In FIG. 5, the distance from the reference line to the bottom of the tooth portion 12b is the distance between points n and m. The distance from the recesses 31 and 32 to the bottom of the tooth portion 12b is the distance between points l and m. The above-described distance ratio (%) can be calculated as [(distance between points l and m/distance between points n and m)×100]. When the above-described distance ratio is 20% or more, each core piece 10 can be structured such that a certain interval is provided between each of the recesses 31 and 32 and the bottom of the tooth portion 12 (12b) on a surface of the yoke portion 11 at a side at which the tooth portions 12 project, that is, the upper surface of the yoke portion 11. In this case, when the core piece 10 is formed by using the mold 5 (see FIG. 6), reduction in the strength of a first lower punch 71 for forming the upper surface of the yoke portion 11 due to reduction in the thickness of the first lower punch 71 can be suppressed.

The ratio of the distance from the recesses 31 and 32 to the bottom of the tooth portion 12 (12b) to the distance from the reference line to the bottom of the tooth portion 12 (12b) may instead be 30% or more. Although there is no particular upper limit on the ratio of the distance from the recesses 31 and 32 to the bottom of the tooth portion 12 (12b), the upper limit may be, for example, 90%. The distance from the recesses 31 and 32 to the bottom of the tooth portion 12 (12b) may be, for example, 1 mm or more and 9 mm or less, or 2 mm or more and 8 mm or less.

<Size of Protrusions>

In this example, the size of the protrusions 21 and 22 is 1 mm or more and 10 mm or less. The size of the protrusions 21 and 22 is defined as follows. That is, referring to FIG. 5, in this example, the distance between the straight line $L_1$ passing through the apices of the protrusions 21 and 22 and the straight line $L_2$ passing through the apex of the recess 23 positioned between the adjacent protrusions 21 and 22 is defined as the size of the protrusions 21 and 22.

When the size of the protrusions 21 and 22 is 1 mm or more, the yoke portions 11 of adjacent ones of the core pieces 10 can be easily positioned relative to each other. When the size of the protrusions 21 and 22 is 10 mm or less, the protrusions 21 and 22 can be easily formed. The size of the protrusions 21 and 22 may instead be 2 mm or more and 8 mm or less.

<Minimum Radius of Curvature of Protrusions and Recesses>

In this example, in plan view of each yoke portion 11 from above, that is, from the upper side toward which the tooth portions 12 project, the minimum radius of curvature of the protrusions 21 and 22 and the recesses 31 and 32 is 1.0 mm or more. When the protrusions 21 and 22 and the recesses 31 and 32 are shaped to have curves with small radii of curvature, the side surfaces 52, 53 (see FIG. 7) of the die 50 for forming the side surfaces 20 and 30 of the yoke portion 11 are also shaped to have curves. Stress tends to concentrate at curves with small radii of curvature. When the minimum radius of curvature of the protrusions 21 and 22 and the recesses 31 and 32 is 1.0 mm or more, each core piece 10 can be formed by using the mold 5 (see FIG. 6) with less stress concentration at the die 50.

The minimum radius of curvature of the protrusions 21 and 22 and the recesses 31 and 32 may instead be 2.0 mm or more. Although there is no particular upper limit on the minimum radius of curvature of the protrusions 21 and 22 and the recesses 31 and 32, the upper limit may be, for example, 20 mm.

<Thickness of Yoke Portions>

Figure 3:
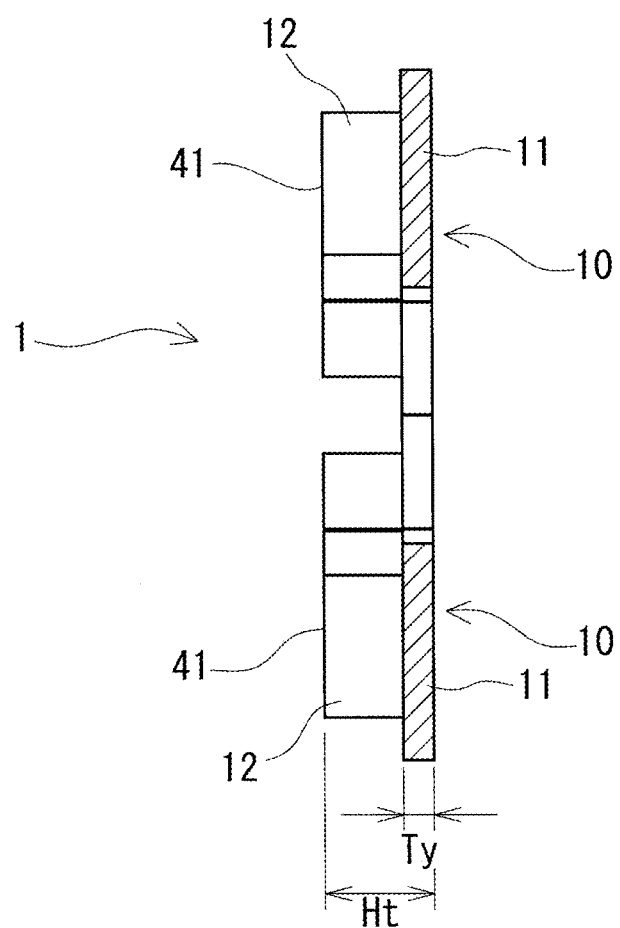
FIG. 3 is a schematic sectional view of the core taken along line in FIG. 2.

The thickness of each yoke portion 11 is, for example, 1.0 mm or more and 10 mm or less, or 2 mm or more and 8 mm or less. The thickness of each yoke portion 11 is the dimension of the yoke portion 11 in the axial direction of the core 1. In FIG. 3, the thickness of the yoke portions 11 is denoted by Ty. As described below, the core 1 may be formed by assembling the core pieces 10 into an annular shape and fitting and fixing an annular member 90 (see FIG. 10) to the outer peripheral surfaces of the yoke portions 11. When the yoke portions 11 have a thickness of 1.0 mm or more, the annular member 90 can be easily fixed. When each yoke portion 11 is excessively thick, large load is placed on the die 50 when the core piece 10 is formed by using the mold 5 (see FIG. 6). Therefore, the thickness of each yoke portion 11 may be 10 mm or less.

<Deviation from Roundness of Yoke Portions>

When the core 1 is formed by assembling the core pieces 10 into an annular shape, the deviation from roundness of the outer peripheral surfaces of the yoke portions 11 is preferably 0.1 mm or less. When the deviation from roundness of the outer peripheral surfaces of the yoke portions 11 is 0.1 mm or less, the core 1 has a high dimensional accuracy. Therefore, when the annular member 90 (see FIG. 10) is fitted and fixed to the outer peripheral surfaces of the yoke portions 11, the annular member can be easily fixed to the outer peripheral surfaces of the yoke portions 11. In addition, when the core 1 is structured such that the deviation from roundness of the outer peripheral surfaces of the yoke portions 11 is 0.1 mm or less, the outer peripheral surfaces of the yoke portions 11 of the core pieces 10 that constitute the core 1 are aligned in the circumferential direction. In other words, radial displacements between the core pieces 10 are small, and the tooth portions 12 of the core pieces 10 are aligned in the circumferential direction. When the core 1 is included in a rotary electric machine 300 (see FIG. 12) as described below, the end surfaces 41 of the tooth portions 12 are arranged to face magnets 220 of a rotor 200. When radial displacements between the core pieces 10 are small, the rotary electric machine 300 is structured such that the end surfaces 41 of the tooth portions 12 face the magnets 220 of the rotor 200 over uniform areas. Therefore, degradation of the properties of the rotary electric machine 300 can be suppressed. For example, cogging can be reduced. The deviation from roundness of the outer peripheral surfaces of the yoke portions 11 may be measured by point measurement to exclude recesses formed at locations where the side surfaces 20 and 30 (see FIGS. 4 and 5) of the yoke portions 11 of adjacent ones of the core pieces 10 are connected to each other.

<Heights of End Surfaces of Tooth Portions>

The core 1 is preferably structured such that the difference between the position of the end surface 41 of the highest one of the tooth portions 12 of the core pieces 10 and the position of the end surface 41 of the lowest one of the tooth portions 12 of the core pieces 10 is 0.15 mm or less. Referring to FIG. 3, assuming that the surfaces of the yoke portions 11 at the side opposite to the side at which the tooth portions 12 project, that is, the lower surfaces of the yoke portions 11, are placed on a flat surface, the position of the end surface 41 of each tooth portion 12 is defined as a height position of the end surface 41 with respect to the flat surface in the axial direction. In FIG. 3, the height position of the end surface 41 of each tooth portion 12 is denoted by Ht. When the difference between the position of the end surface 41 of the highest tooth portion 12 and the position of the end surface 41 of the lowest tooth portion 12 is 0.15 mm or less, variation in height between the end surfaces 41 of the tooth portions 12 is small. When the core 1 is included in the rotary electric machine 300 (see FIG. 12) as described below, the end surfaces 41 of the tooth portions 12 are arranged to face the magnets 220 of the rotor 200. When the variation in height between the end surfaces 41 of the tooth portions 12 is small, the rotary electric machine 300 can be structured such that variation in the interval between the end surface 41 of each tooth portion 12 and the rotor 200 is small. Therefore, degradation of the properties of the rotary electric machine 300 can be suppressed. For example, cogging can be reduced.

<Deviation from Flatness of End Surface of Each Tooth Portion>

The deviation from flatness of the end surface 41 of each tooth portion 12 is preferably 0.2 mm or less. In this case, the rotary electric machine 300 (see FIG. 12) can be structured such that the end surfaces 41 of the tooth portions 12 closely face the rotor 200. Accordingly, degradation of the properties of the rotary electric machine 300 can be suppressed.

Figure 9:
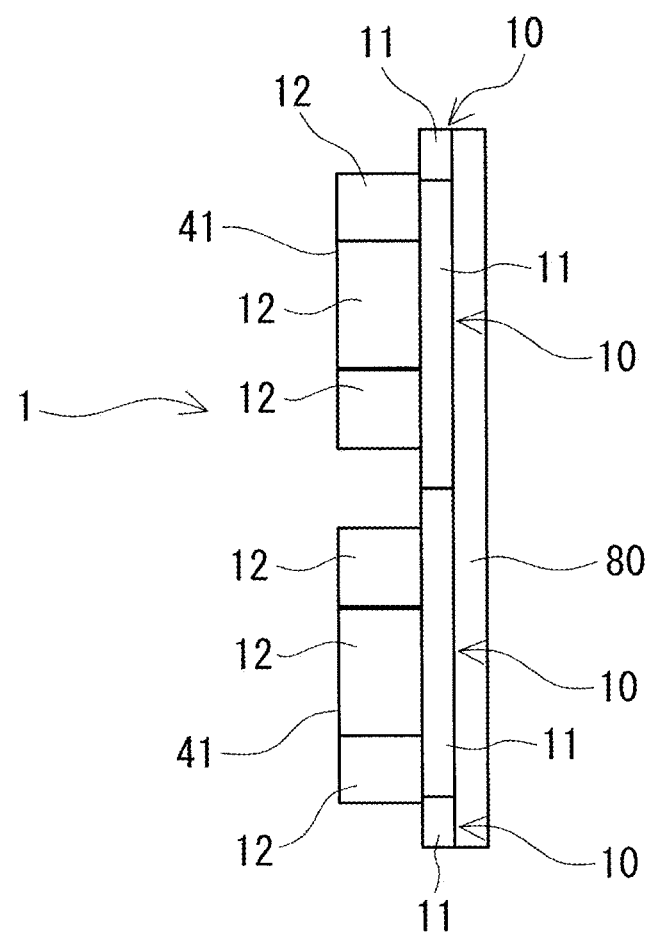
FIG. 9 is a schematic side view of a core including a plate-shaped member.

In this example, the side surfaces of the yoke portions 11 of the core pieces 10 that are adjacent to each other are bonded to each other so that the core pieces 10 assembled in an annular shape are integrated together. As illustrated in FIG. 9, for example, a plate-shaped member 80 may be disposed on the yoke portions 11 of the core pieces 10 that are adjacent to each other at a side opposite to the side at which the tooth portions 12 project, that is, the lower side. The surfaces of the yoke portions 11 at the opposite side, that is, the lower surfaces of the yoke portions 11, may be bonded to the plate-shaped member 80. In this case, the core pieces 10 that are assembled in an annular shape are fixed to the plate-shaped member 80, and are thereby integrated together.

Figure 10:
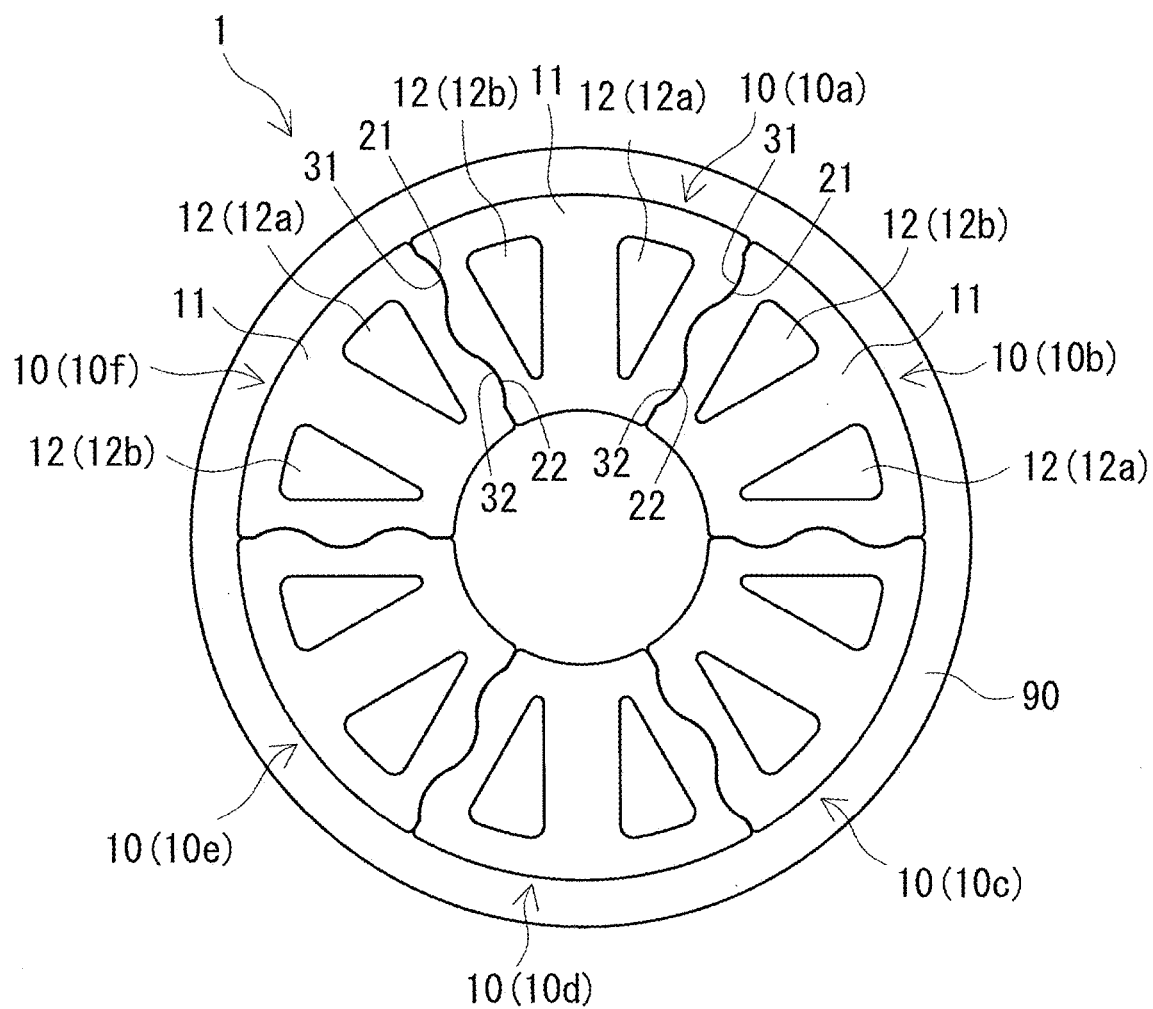
FIG. 10 is a schematic top view of a core including an annular member.

As illustrated in FIG. 10, the core 1 may include the annular member 90 fitted to the outer peripheral surfaces of the yoke portions 11 of the core pieces 10 that are assembled in an annular shape. The annular member 90 is fixed to the core pieces 10 that constitute the core 1 by radially inward contraction force thereof. In this example, the annular member 90 is fitted to the outer peripheral surfaces of the yoke portions 11 by shrink-fitting. The material and dimensions of the annular member 90 are such that the inner diameter of the annular member 90 is less than the outer diameter of the yoke portions 11 of the core 1 at normal temperature before shrink-fitting and exceeds the outer diameter of the yoke portions 11 of the core 1 when the annular member 90 is heated for shrink-fitting. In FIG. 2, the outer diameter of the yoke portions 11 is denoted by Do. In addition, in FIG. 2, the inner diameter of the yoke portions 11 is denoted by Di. The procedure for fitting the annular member 90 to the core pieces 10 assembled in an annular shape by shrink-fitting is as follows. That is, the annular member 90 is heated to a predetermined temperature so that the annular member 90 expands and that the inner diameter of the annular member 90 exceeds the outer diameter of the yoke portions 11 of the core 1. The annular member 90 that has been heated to increase the inner diameter thereof is fitted to the outer peripheral surfaces of the yoke portions 11 of the core 1. The annular member 90 is cooled so that the annular member 90 contracts and is fastened to the outer periphery of the core 1.

When the annular member 90 is provided, the core pieces 10 can be integrated together. In addition, the outer peripheries of the yoke portions 11 are fastened by the radially inward contraction force of the annular member 90, so that the core pieces 10 can be strongly fastened together. One or both of the plate-shaped member 80 and the annular member 90 described above may be used.

<Dust Core>

Each core piece 10 is formed of a dust core. The dust core is formed by compression molding by using soft magnetic powder. The soft magnetic powder is a collection of a plurality of coated soft magnetic particles, which are soft magnetic particles having insulating coatings on the surfaces thereof. Thus, the dust core is composed of a collection of a plurality of coated soft magnetic particles. The soft magnetic particles are preferably iron-based particles composed of at least one of pure iron and an iron-based alloy. Pure iron is defined as iron having a purity of 99 mass % or more. The iron-based alloy may be at least one selected from the group consisting of an iron-silicon (Fe—Si) based alloy, an iron-aluminum (Fe—Al) based alloy, an iron-chromium-aluminum (Fe—Cr—Al) based alloy, and an iron-chromium-silicon (Fe—Cr—Si) based alloy. The soft magnetic particles that form the dust core may be only particles composed of pure iron, only particles composed of an iron-based alloy, or mixed particles containing particles composed of pure iron and particles composed of an iron-based alloy. The insulating coatings may be, for example, phosphate coatings or silica coatings.

Pure iron and the above-described iron-based alloy are relatively soft. Therefore, when the soft magnetic particles are iron-based particles composed of pure iron or the above-described iron-based alloy, the soft magnetic particles are easily deformed when the dust core is formed. Accordingly, a high-density dust core having a high dimensional accuracy can be obtained. When a high-density dust core is used, the mechanical strength and magnetic properties of the core piece 10 can be improved. When the soft magnetic particles have insulating coatings on the surfaces thereof, the electrical insulation between the soft magnetic particles can be increased. Therefore, iron loss of the core piece 10 due to eddy current loss can be reduced.

The insulating coatings preferably include phosphate coatings. The phosphate coatings are highly adhesive to the iron-based particles, and are easily deformed. Therefore, when the insulating coatings include the phosphate coatings, the insulating coatings easily follow the deformation of the iron-based particles when the dust core is formed. Accordingly, the insulating coatings are not easily damaged, and the iron loss of the core piece 10 can be reduced.

The relative density of the dust core is preferably 90% or more. When a high-density dust core is used, the mechanical strength and magnetic properties of the core piece 10 can be improved. More preferably, the relative density is 93% or more. The relative density is the ratio (%) of the actual density of the dust core to the true density of the dust core. The true density is a theoretical density determined by assuming that no internal voids are present. The true density of the dust core can also be determined from the true density of the soft magnetic powder that is used. The relative density of the dust core is calculated as [(molding density of dust core/true density of dust core)×100]. To determine the molding density of the dust core, the dust core is immersed in oil so that the dust core is impregnated with the oil. The molding density of the dust core can be calculated as [oil-impregnated density×(mass of dust core before impregnation with oil/mass of dust core impregnated with oil)]. The oil-impregnated density is a value obtained by dividing the mass of the dust core impregnated with the oil by the volume of the dust core. The volume of the dust core can be measured typically by a liquid displacement method.

Figure 6:
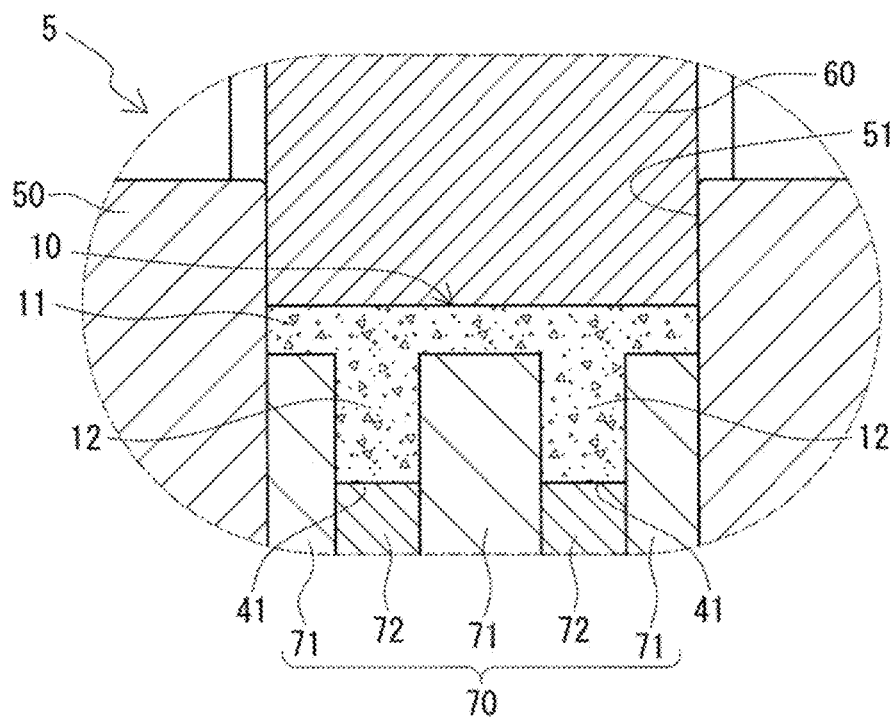
FIG. 6 is a schematic sectional view of an example of a mold for forming the core piece.

The core piece 10 composed of the dust core may be formed by using, for example, the mold 5 illustrated in FIG. 6. The mold 5 includes the die 50 having a die hole 51, an upper punch 60, and a lower punch 70. The upper punch 60 and the lower punch 70 are fitted to the die hole 51 in the die 50. The die 50 forms the peripheral surface of the yoke portion 11. The upper punch 60 forms the lower surface of the yoke portion 11, that is, the surface at the side opposite to the side at which the tooth portions 12 project. The lower punch 70 includes the first lower punch 71 and second lower punches 72. The first lower punch 71 forms the upper surface of the yoke portion 11, that is, the surface at the side at which the tooth portions 12 project, and the peripheral surfaces of the tooth portions 12. The first lower punch 71 has through holes in which the second lower punches 72 are inserted and that extend in the axial direction. The second lower punches 72 are inserted into the first lower punch 71 to form the end surfaces 41 of the tooth portions 12.

To form the core piece 10 by using the mold 5, the lower punch 70 is fitted to the die hole 51 in the die 50, and then the die hole 51 is filled with the soft magnetic powder. Then, the core piece 10 is formed by compressing the soft magnetic powder with the upper punch 60 and the lower punch 70.

The average particle diameter of the soft magnetic powder may be, for example, 20 μm or more and 300 μm or less, or 40 μm or more and 250 μm or less. When the average particle diameter of the soft magnetic powder is in the above-described ranges, the soft magnetic powder is easy to handle and can be easily compressed. The average particle diameter of the soft magnetic powder, which is measured by using a laser diffraction/dispersion particle-diameter/particle-size-distribution analyzer, means the particle diameter at which the cumulative mass is 50% of the mass of all particles.

The density of the core piece 10 can be increased by increasing the molding pressure applied to compress the soft magnetic powder. The molding pressure may be, for example, 700 MPa or more, or 2000 MPa or more.

Figure 7:
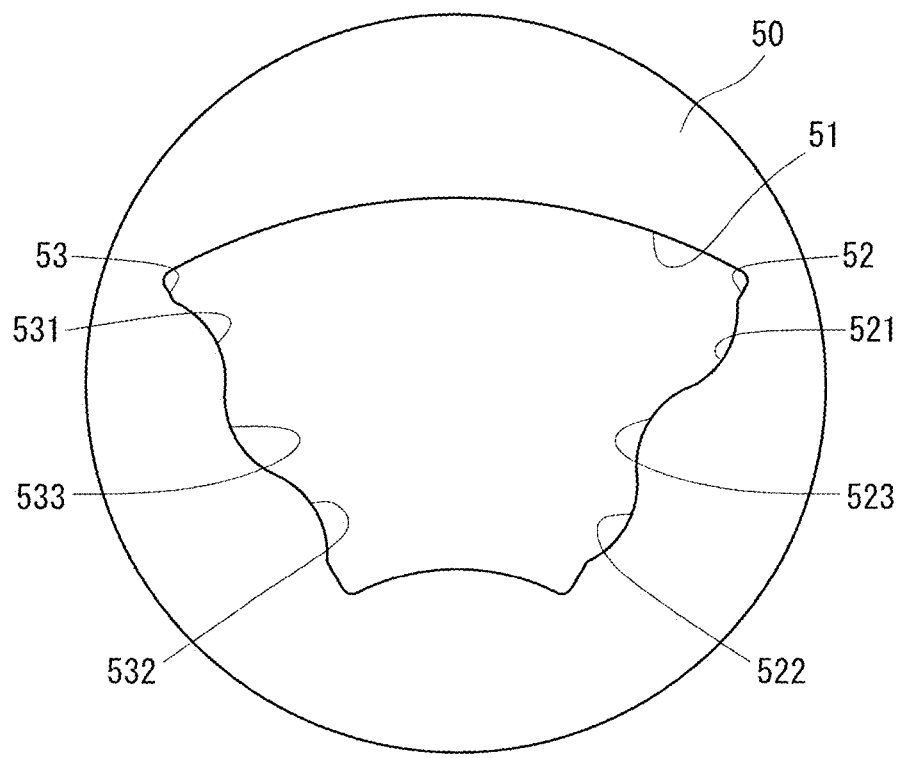
FIG. 7 is a schematic top view of a die.

As illustrated in FIG. 7, the die hole 51 in the die 50 has a shape corresponding to the shape of the peripheral surface of the yoke portion 11 (see FIG. 5). One side surface 52 of the die hole 51 forms the side surface 20 of the yoke portion 11. The side surface 52 has recesses 521 and 522 and a protrusion 523 (see also FIG. 8) for forming the protrusions 21 and 22 and the recess 23, respectively, so that the shape thereof corresponds to the shape of the side surface 20 of the yoke portion 11. The other side surface 53 of the die hole 51 forms the side surface 30 of the yoke portion 11. The side surface 53 has protrusions 531 and 532 and a recess 533 for forming the recesses 31 and 32 and the protrusion 33, respectively, so that the shape thereof corresponds to the shape of the side surface 30 of the yoke portion 11.

Figure 8:
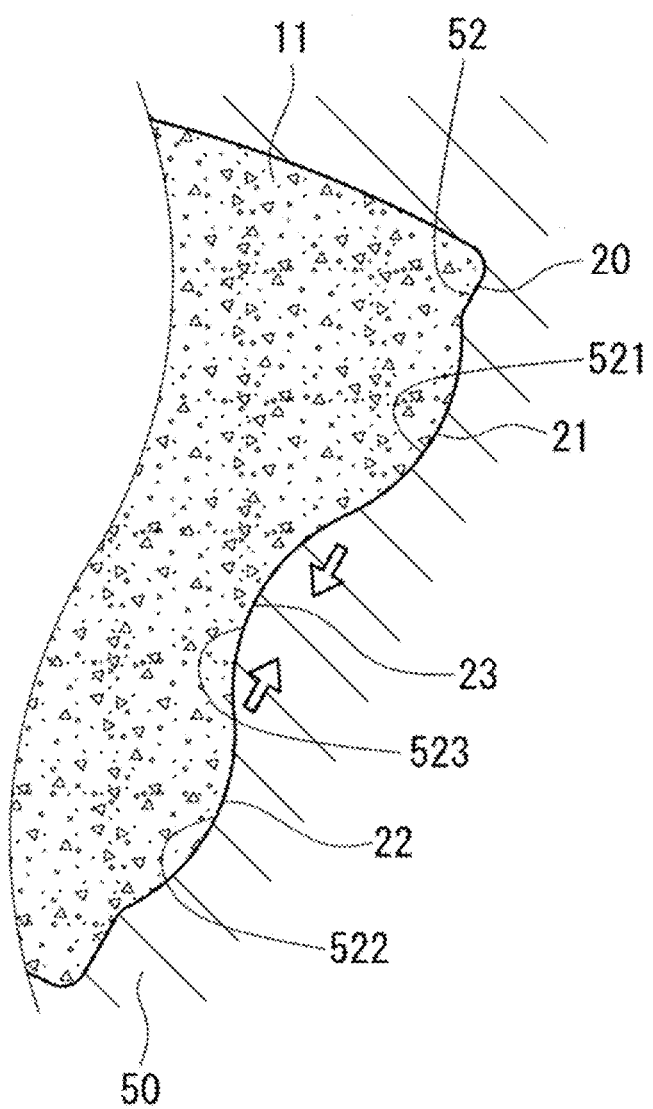
FIG. 8 is an enlarged top view of an important part of the die.

When the material powder is compressed to form the core piece 10, the die 50 receives stress in directions such that the die hole 51 expands. As illustrated in FIG. 8, on the side surface 52 of the die 50, the protrusion 523 of the die 50 disposed between the protrusions 21 and 22 of the yoke portion 11 receives stress from both sides thereof. In FIG. 8, the stress applied to the protrusion 523 is shown by the empty arrows. In this example, as described above with reference to FIG. 3, the interval between the adjacent protrusions 21 and 22 is 80% or less of the yoke-portion side length. The interval is, for example, as small as 40 mm or less. Therefore, the stress applied to the protrusion 523 is offset and reduced. Thus, the stress applied to the side surface 52 of the die 50 can be reduced, and the possibility of breakage of die 50 can be reduced. In addition, in this example, the adjacent protrusions 21 and 22 have shapes that are symmetrical to each other. Accordingly, the protrusion 523 receives stress of substantially the same magnitude at both sides thereof. Therefore, the stress applied to the protrusion 523 can be canceled, and the possibility of breakage of the die 50 can be more effectively reduced.

In the molding process, the recess 533 on the side surface 53 of the die 50 is pressed by the material powder such that the recess 533 expands. Since the recess 533 is disposed between the protrusions 531 and 532, which are separated from the outer peripheral edge of the die 50 by a large distance, damage to the mold by the stress does not easily occur.

<Stator>

Figure 11:
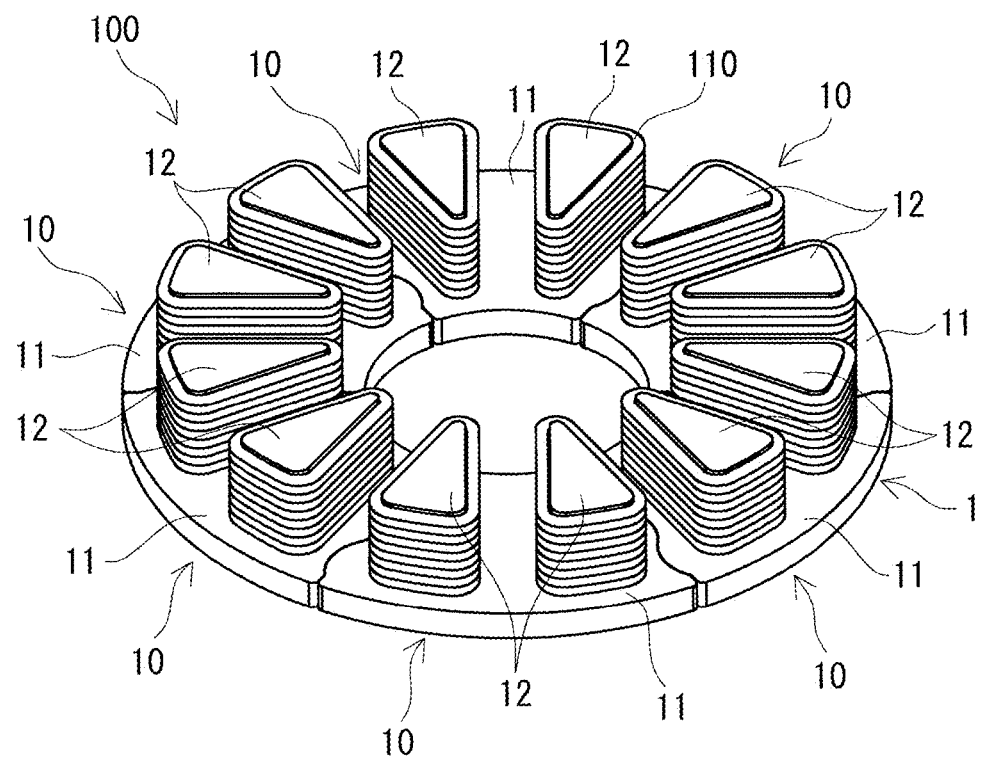
FIG. 11 is a schematic perspective view of a stator according to the embodiment.

A stator 100 according to the embodiment will be described with reference to FIG. 11. The stator 100 is for use in an axial-gap rotary electric machine. The stator 100 includes the core 1 and coils 110 provided around the tooth portions 12 of the core pieces 10 that constitute the core 1. Each coil 110 is a tubular coil composed of a helically wound wire. In this example, the coil 110 is a triangular tubular edgewise-wound coil including a rectangular wire made of enamel.

<Rotary Electric Machine>

Figure 12:
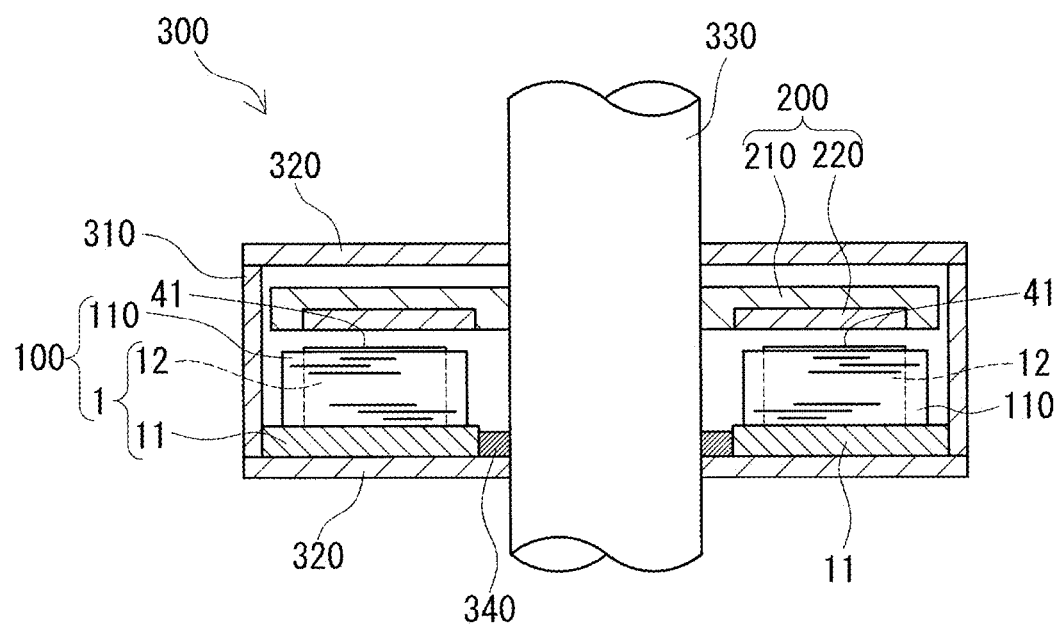
FIG. 12 is a schematic sectional view of a rotary electric machine according to the embodiment.

The rotary electric machine 300 according to the embodiment will be described with reference to FIG. 12. The rotary electric machine 300 may be either a motor or a generator. The rotary electric machine 300 includes the rotor 200 and the stator 100. The rotary electric machine 300 is an axial-gap rotary electric machine in which the rotor 200 and the stator 100 are arranged to face each other in the rotational axis direction.

The stator 100 and the rotor 200 are disposed in a cylindrical casing 310. Disc-shaped plates 320 are attached to both ends of the casing 310. Each plate 320 has a through hole at the center thereof, and a rotating shaft 330 extends through the casing 310.

(Rotor)

The rotor 200 includes a plurality of flat plate-shaped magnets 220 and a circular annular retaining plate 210 that supports the magnets 220. The shape of the magnets 220 in plan view substantially corresponds to the shape of the end surfaces 41 of the tooth portions 12. When the end surfaces 41 of the tooth portions 12 are triangular, the magnets 220 may be, for example, triangular or trapezoidal in plan view. The retaining plate 210 is fixed to the rotating shaft 330 and rotates together with the rotating shaft 330. The magnets 220 are embedded in the retaining plate 210. The magnets 220 are arranged at equal intervals in the circumferential direction of the rotating shaft 330. The magnets 220 are magnetized in the axial direction of the rotating shaft 330. The magnets 220 that are adjacent to each other in the circumferential direction are magnetized in the opposite directions.

(Stator)

The stator 100 is disposed such that the end surfaces 41 of the tooth portions 12 face the magnets 220 of the rotor 200. The outer peripheral surfaces of the yoke portions 11 of the core 1 are fitted to the inner peripheral surface of the casing 310, so that the stator 100 is fixed to the casing 310. A circular annular bearing 340 that supports the rotating shaft 330 in a rotatable manner is attached to the inner peripheral surfaces of the yoke portions 11.

Advantageous Effects of Embodiment

The core 1, the stator 100, and the rotary electric machine 300 according to the above-described embodiment have the following advantageous effects.

Each of the core pieces 10 that constitute the core 1 is structured such that the yoke portion 11 has the plurality of protrusions 21 and 22 on one side surface 20 and the plurality of recesses 31 and 32 corresponding to the protrusions 21 and 22 on the other side surface 30. Therefore, when the core pieces 10 are assembled into an annular shape, the yoke portions 11 of the adjacent ones of the core pieces 10 can be positioned relative to each other by fitting the protrusions 21 and 22 to the recesses 31 and 32. Therefore, radial displacements between the core pieces 10 that are adjacent to each other can be reduced. Accordingly, the core pieces 10 that are adjacent to each other can be easily positioned relative to each other, and the core 1 is easy to assemble.

The stator 100 includes the above-described core 1, and is therefore easy to assemble. The rotary electric machine 300 includes the stator 100 that is easy to assemble, and is therefore easy to produce.

Estimation Example 1

Distribution of the stress applied to the die 50 when the above-described core piece 10 of the embodiment is formed by using the mold 5 was analyzed by computer aided engineering (CAE).

The stress analysis was performed by using "NX Nastran" manufactured by Siemens AG. The analysis conditions were set as follows. That is, the molding pressure was set to 980 MPa. With regard to physical property values of the die 50, the Young's modulus was set to 206000 MPa, and the Poisson's ratio was set to 0.3.

The core piece 10 was designed to have the following dimensions:

Thickness of yoke portion 11 (Ty in FIG. 3): 5 mm
Length of side surface 20 of yoke portion 11: 40 mm
Size of protrusions 21 and 22: 3 mm
Ratio of distance from recesses 31 and 32 to bottom of tooth portion 12: 70%
Minimum radius of curvature of protrusions 21 and 22 and recesses 31 and 32: 3.0 mm The maximum stress applied to the protrusion 523 on the side surface 52 of the die 50 was determined based on the result of the stress analysis by CAE. In Test Example 1, the interval between the protrusions 21 and 22 was changed to change the ratio of the interval between the protrusions to the yoke-portion side length, and the maximum stress was determined for each ratio. The results are shown in Table 1.

TABLE 1

| Ratio of Interval between Protrusions (%) | Maximum Stress (MPa) |
| --- | --- |
| 35 | 638 |
| 60 | 996 |
| 80 | 1313 |
| 85 | 1682 |

It is clear from Table 1 that the maximum stress applied to the protrusion of the die in the molding process decreases as the interval between the protrusions decreases. In particular, when the interval between the protrusions is 80% or less of the yoke-portion side length, the maximum stress applied to the protrusion can be reduced to 1500 MPa or less.

Trial Production Example 1

Core pieces having the same structure as that of the above-described core pieces 10 of the embodiment were manufactured and evaluated.

The core pieces 10 were designed to have the following dimensions:
Thickness of yoke portions 11 (Ty in FIG. 3): 5 mm
Outer diameter of yoke portions 11 (Do in FIG. 2): 120 mm
Inner diameter of yoke portions 11 (Di in FIG. 2): 40 mm
Height of end surface 41 of each tooth portion 12 (Ht in FIG. 3): 18 mm
Length of side surface 20 of each yoke portion 11: 40 mm
Ratio of interval between protrusions 21 and 22: 57%
Size of protrusions 21 and 22: 3 mm
Ratio of distance from recesses 31 and 32 to bottom of tooth portion 12: 70%
Minimum radius of curvature of protrusions 21 and 22 and recesses 31 and 32: 3.0 mm Soft magnetic powder used as the material was powder of coated soft magnetic particles, which were pure iron particles having phosphate coatings on the surfaces thereof. The average particle diameter of the soft magnetic powder was 50 μm. The molding pressure was 980 MPa. The relative density of the core pieces 10 composed of the obtained dust cores was 92%.

Six core pieces 10 were manufactured under the same conditions, and were assembled into a circular annular shape to form the core 1. Each core piece 10 included two tooth portions 12. The total number of tooth portions 12 was twelve. The obtained core 1 was evaluated as follows.

<Deviation from Roundness of Yoke Portions>

The deviation from roundness of the outer peripheral surfaces of the yoke portions was measure by using a commercially available 3D shape measuring device. More specifically, the deviation from roundness was measured by point measurement by using "VR-3200" manufactured by Keyence Corporation. As a result, the deviation from roundness of the outer peripheral surfaces of the yoke portions was 0.1 mm or less.

<Deviation from Flatness of End Surface of Each Tooth Portion>

The deviation from flatness of the end surface of each tooth portion was measured by using a commercially available 3D shape measuring device, more specifically, "VR-3200" manufactured by Keyence Corporation. As a result, the deviation from flatness was 0.1 mm or less for each of the end surfaces of the twelve tooth portions.

<Heights of End Surfaces of Tooth Portions>

The lower surfaces of the yoke portions were placed on a flat surface, and the height positions of the end surfaces of the twelve tooth portions were measured by using a commercially available 3D shape measuring device, more specifically, "VR-3200" manufactured by Keyence Corporation, and the difference between the position of the end surface of the highest tooth portion and the position of the end surface of the lowest tooth portion was determined. The difference was 0.15 mm.

REFERENCE SIGNS LIST 1 core
10, 10a, 10b, 10c, 10d, 10e, 10f core piece
11 yoke portion
12, 12a, 12b tooth portion
20, 30 side surface
21, 22 protrusion
23 recess
31, 32 recess
33 protrusion
41 end surface
5 mold
50 die
51 die hole
52, 53 side surface
521, 522 recess
523 protrusion
531, 532 protrusion
533 recess
60 upper punch
70 lower punch
71 first lower punch 72 second lower punch
80 plate-shaped member
90 annular member
100 stator
110 coil
200 rotor
210 retaining plate 220 magnet
300 rotary electric machine
310 casing 320 plate
330 rotating shaft 340 bearing
$L_A$, $L_B$ middle line
$L_1$, $L_2$, $L_C$ straight line La center line
a, b point l apex m, n intersection
Ty thickness Ht height position
Do outer diameter Di inner diameter

The invention claimed is:
1. A core for use in an axial-gap rotary electric machine, wherein the core is annular and comprises a plurality of core pieces into which the core is divided in a circumferential direction, wherein each core piece includes a yoke portion, and a tooth portion that is formed integrally with the yoke portion and that projects from the yoke portion in an axial direction, wherein each yoke portion includes a plurality of protrusions provided on one side surface that is connected to the yoke portion of an adjacent one of the core pieces, and a plurality of recesses provided on other side surface that is connected to the yoke portion of another adjacent one of the core pieces, the recesses corresponding to the protrusions, and wherein an interval between the protrusions is 80% or less of a length of the one side surface of the yoke portion, the length being a direct distance between inner and outer peripheries of the yoke portion, wherein, in plan view of each yoke portion from a side toward which the tooth portion projects, a distance from the recesses to a bottom of the tooth portion is 20% or more of a distance from a reference line to the bottom of the tooth portion, the reference line being a middle line between a side surface of the tooth portion and a side surface of the tooth portion of the other adjacent one of the core pieces, the side surfaces facing each other.

2. The core according to claim 1, wherein the protrusions have a size of 1 mm or more and 10 mm or less.

3. The core according to claim 1, wherein, in plan view of each yoke portion from a side toward which the tooth portion projects, a minimum radius of curvature of the protrusions and the recesses is 1.0 mm or more.

4. The core according to claim 1, wherein adjacent ones of the protrusions have shapes that are symmetrical about a center line between the adjacent ones of the protrusions.

5. The core according to claim 1, wherein each yoke portion has a thickness of 1.0 mm or more and 10 mm or less.

6. The core according to claim 1, further comprising:
an annular member fitted to outer peripheral surfaces of the yoke portions of the plurality of core pieces,
wherein the annular member is fixed to the plurality of core pieces by radially inward contraction force thereof.

7. The core according to claim 1, wherein the side surfaces of the yoke portions of the core pieces that are adjacent to each other are bonded to each other, or
wherein the core includes a plate-shaped member disposed on the yoke portions of the core pieces that are adjacent to each other at a side opposite to a side at which the tooth portions project, and surfaces of the yoke portions at the opposite side are bonded to the plate-shaped member.

8. The core according to claim 1, wherein a difference between a position of an end surface of a highest one of the tooth portions of the plurality of core pieces and a position of an end surface of a lowest one of the tooth portions of the plurality of core pieces is 0.15 mm or less.

9. The core according to claim 1, wherein when the plurality of core pieces are assembled in an annular shape, a deviation from roundness of outer peripheral surfaces of the yoke portions is 0.1 mm or less.

10. The core according to claim 1, wherein a deviation from flatness of an end surface of each tooth portion is 0.2 mm or less.

11. A stator for an axial-gap rotary electric machine, the stator comprising:
the core according to claim 1; and
a coil disposed on each of the tooth portions of the core pieces that constitute the core.

12. A rotary electric machine comprising the rotor and the stator, wherein the rotary electric machine is the axial-gap rotary electric machine in which the rotor and the stator are arranged to face each other in an axial direction, and
wherein the stator is the stator according to claim 11.

13. The core according to claim 1, wherein each core piece is formed of a dust core,
wherein the dust core is made of a collection of a plurality of coated soft magnetic particles, which are soft magnetic particles having insulating coatings on surfaces thereof,
wherein the soft magnetic particles are iron-based particles composed of at least one of pure iron and an iron-based alloy, and
wherein the iron-based alloy is at least one selected from a group consisting of an Fe—Si-based alloy, an Fe—Al-based alloy, an Fe—Cr—Al-based alloy, and an Fe—Cr—Si-based alloy.

14. The core according to claim 13, wherein the insulating coatings include phosphate coatings.

15. The core according to claim 13, wherein the dust core has a relative density of 90% or more.

* * * * *